(12) United States Patent
Asano et al.

(10) Patent No.: US 7,615,505 B2
(45) Date of Patent: Nov. 10, 2009

(54) INORGANIC FIBER AND METHOD FOR MANUFACTURING THE SAME

(75) Inventors: Akira Asano, Hamamatsu (JP); Hideki Kitahara, Hamamatsu (JP); Takahito Mochida, Hamamatsu (JP)

(73) Assignee: Nichias Corporation, Tokyo (JP)

( * ) Notice: Subject to any disclaimer, the term of this patent is extended or adjusted under 35 U.S.C. 154(b) by 515 days.

(21) Appl. No.: 11/509,680

(22) Filed: Aug. 25, 2006

(65) Prior Publication Data

US 2007/0049481 A1    Mar. 1, 2007

(30) Foreign Application Priority Data

Aug. 31, 2005   (JP) .............................. 2005-252587

(51) Int. Cl.
*C03C 13/06*    (2006.01)
(52) U.S. Cl. ............................. 501/36; 501/35; 501/70
(58) Field of Classification Search .................... 501/35, 501/36, 70
See application file for complete search history.

(56) References Cited

U.S. PATENT DOCUMENTS 4,756,732 A * 7/1988 Barthe et al. .................. 65/461
4,830,989 A * 5/1989 Trivedi et al. ................. 501/35
2003/0000254 A1 * 1/2003 Bauer .......................... 65/376
2005/0079970 A1 * 4/2005 Otaki et al. ................... 501/35

FOREIGN PATENT DOCUMENTS

| EP | 1 338 575 A1 | 8/2003 |
| EP | 1 484 292 A1 | 12/2004 |
| JP | B2 3630167 | 12/2004 |
| WO | WO 93/15028 | 8/1993 |
| WO | WO 95/31410 | 11/1995 |
| WO | WO 96/00196 | 1/1996 |
| WO | WO 98/18618 | 5/1998 |
| WO | WO 03/060016 A1 | 7/2003 |

OTHER PUBLICATIONS

Potter, et al; (1991); "Glass fiber dissolution in a physiological saline solution" Glastechnische Berichte; vol. (64); pp. 16-28.

* cited by examiner

*Primary Examiner*—Karl E Group
*Assistant Examiner*—Elizabeth A Bolden
(74) *Attorney, Agent, or Firm*—Oliff & Berridge, PLC

(57) ABSTRACT

Disclosed herein is a bio-soluble inorganic fiber with high tensile strength, manufactured in a method comprising: heating and melting a raw material which includes, on a weight basis, 60 to 80 percent of $SiO_2$, 5 to 20 percent of MgO, 5 to 30 percent of CaO, 0.5 to 5 of $Al_2O_3$, and 0.1 to 5 of BaO, at a temperature of 1800 to 2100 degrees Celsius; and exposing the melting material to an air flow for fiber forming.

6 Claims, 2 Drawing Sheets

INORGANIC FIBER AND METHOD FOR MANUFACTURING THE SAME

BACKGROUND OF THE INVENTION

1. Field of the Invention

The present invention relates to biosoluble inorganic fiber and a method for manufacturing same.

2. Description of the Related Art

Inorganic fibers such as heat-resistant glass wools and ceramic fibers are widely used for the purpose of heat insulation in various types of building structures due to their excellent heat-resistance properties.

In recent years, however, the potential for bodily harm from the inhalation of inorganic fibers has become a serious concern of the general public. Comparatively large inorganic fibers do not have much effect on human health as they are trapped in nose or mouth, while fine inorganic fibers may pass through the nostrils or oral cavity, enter the lungs and cause inflammation of lung cells, by which mutation of DNA genes or the growth of cancer cells can be induced. Thus, there is a need for a countermeasure against this health problem.

Imparting inorganic fibers with the property of bio-solubility (dissolvable in the living body) is known to be an effective countermeasure for the problem. Japanese Patent No. 3630167 discloses one example of such a bio-soluble inorganic fiber.

However, there is a challenge to overcome in the use of the bio-soluble inorganic fiber. Bio-soluble inorganic fibers are often processed into blankets, mats or felt materials for use as heat insulation in buildings structures. Once woven into these products, they do not demonstrate sufficient tensile strength per single fiber, affecting the general strength of the products.

SUMMARY OF THE INVENTION

The present invention was made in view of the above background. One object of the present invention is to provide a bio-soluble inorganic fiber having a high tensile strength, as well as a method for manufacturing same.

For this purpose, an embodiment of the present invention is an inorganic fiber comprised of, on a weight basis, 60 to 80 percent of $SiO_2$, 5 to 20 percent of MgO, 5 to 30 percent of CaO, 0.5 to 5 percent of $Al_2O_3$ and 0.1 to 5 percent of BaO, and having a single fiber tensile strength of 450 MPa or more.

In the preferred embodiment of the present invention, the $SiO_2$ is contained within a range of from 72 to 80 percent by weight.

In another embodiment of the present invention, the inorganic fiber has an apparent volume of 200 cm³/g or more per unit weight after being agitated in water for 15 seconds and being left in a static condition, and has an apparent volume exceeding 50 cm³/g or more per unit weight after being agitated in water for another 285 seconds and being left in a static condition.

In another embodiment of the present invention, the inorganic fiber has a heat shrinkage coefficient of within the range of 1.0 to 5.0 percent after heating for 8 hours at a temperature of 1260 degrees Celsius.

In another embodiment of the present invention is a method for manufacturing the inorganic fiber, comprising heating and melting a raw material including, on a weight basis, 60 to 80 percent of $SiO_2$, 5 to 20 percent of MgO, 5 to 30 percent of CaO, 0.5 to 5 percent of $Al_2O_3$ and 0.1 to 5 percent of BaO at a temperature of 1800 to 2100 degrees Celsius, and exposing the melting material to an air flow for fiber forming.

In the manufacturing method, the melting material preferably has a viscosity index (V) within the range of 1.5 to 2.0 g/cm² which is calculated by the following formula:

Viscosity index (V)=weight mass (g)/projective area (cm²)

DETAILED DESCRIPTION OF THE PREFERRED EMBODIMENTS

The following is a detailed description of the best mode of carrying out the present invention.

The inventors of the present invention have discovered that a bio-soluble inorganic fiber having a high tensile strength can be obtained by adding BaO to a melting material that mainly contains $SiO_2$, MgO, CaO and $Al_2O_3$.

An inorganic fiber of the embodiment preferably contains, on a weight basis:

| | |
|---|---|
| $SiO_2$ | 60 to 80% |
| MgO | 5 to 20% |
| CaO | 5 to 30% |
| $Al_2O_3$ | 0.5 to 5% |
| BaO | 0.1 to 5% |

The above $SiO_2$ has a property that increases heat resistance, and is preferably contained within the range of 72 to 80 by weight.

The MgO and CaO provide bio-solubility to the inorganic fiber. The term "bio-solubility" as used herein is defined as the property of dissolvability in lung fluid or other physiological fluids, which can be evaluated by the degree of solubility in saline.

The $Al_2O_3$ reduces the bio-solubility of the inorganic fiber. An inorganic fiber with excess bio-solubility may melt through atmospheric moisture and cannot be used as a heat insulating material for building structures. Adding $Al_2O_3$ to an inorganic fiber controls the bio-solubility thereof and prevents the fiber from being more soluble than necessary.

The BaO increases the tensile strength of the inorganic fiber. Adding BaO at the percentage noted makes the tensile strength of a single inorganic fiber 450 MPa or more. As mentioned above, inorganic fibers are used as raw materials in the manufacture of blankets, mats, etc., for heat insulation in buildings. With a tensile strength of 450 MPa or more, heat insulating boards are less likely to lose their original shape during transportation or processing, and handling of the products becomes significantly easier.

In addition, the addition of BaO increases the break resistance of the inorganic fiber. This prevents the inorganic fibers from breaking and losing their original shape during transportation or processing, and handling of these boards becomes significantly easier. Regarding the break resistance of a single fiber, the fiber itself is too small and it was difficult to perform a quantitative evaluation. Therefore, the approach employed to evaluate break resistance is described in the example below.

The inorganic fiber according to the embodiment is manufactured by mixing the material of the above composition, heating and melting the material at a temperature of 1800 to 2100 degrees Celsius, and exposing the melting material to an air flow for fiber formation. In order to expose the melting material to an air flow, a fiber forming method with a spinner or a quenching method with a blower may be used, for example.

Figure 1:
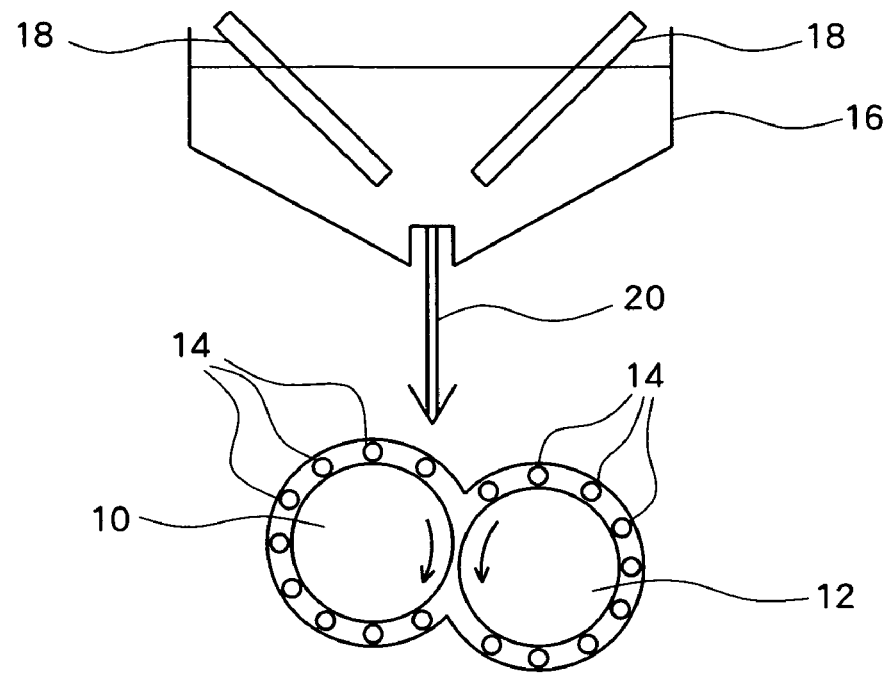
FIG. 1 is a schematic structural view of the spinner used in the spinning method.

FIG. 1 is a schematic structural view illustrating the spinner used in the spinner fiber forming method. In FIG. 1, the spinner is composed of two rotating drums (10) and (12) which are positioned very close to each other, but never come into contact. The two drums are rotated in the directions of the arrows by a suitable driving means as shown in FIG. 1. In addition to the spinner, there are multiple jet orifices (14) behind the two drums, which generate air flow. The above-mentioned material is heated and melted by electrodes (18) in a heating furnace (16).

While the drums (10) and (12) rotate at a speed of 10000 to 15000 rpm and the jet orifices generate an air flow, the melting material (20) which is heated and melted raw material is dropped and supplied onto the surface of the rotating drum (10). Depending on the viscosity of the melting material (20), the melting material (20) spreads over the surfaces of drums (10) and (12). Then the melting material (20) is blown by the air flow that is injected through the jet orifices (14), and is formed into fibers. In this way, the inorganic fiber of the present invention is manufactured.

Figure 2:
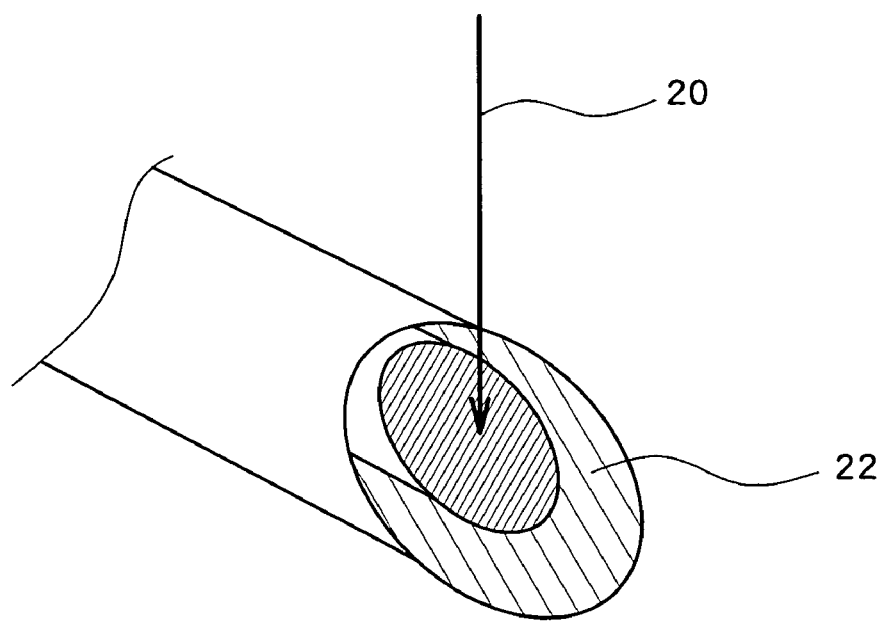
FIG. 2 is a schematic structural view of the nozzle used in the fast-cooling blowing method.

FIG. 2 is a schematic structural view illustrating the nozzle used in the quenching method with a blower. In FIG. 2, the nozzle has a tip that is cut diagonally, forming an opening (22) that injects the air flow. The melting material (20) is dropped and supplied onto the diagonally cut tip surface, with the air flow being injected through the opening (22) so that the melting material (20) is blown by the air flow injected through the opening (22), and is formed into fibers. In this way, the inorganic fiber of the present invention is manufactured.

In either method of production, controlling the viscosity of the melting material (20) is required. In the embodiment, this control of viscosity is realized by adding BaO to the melting material composed of $SiO_2$, MgO, CaO and $Al_2O_3$. The fact that the melting material (20) of the embodiment has an appropriate viscosity for fiber formation at a comparatively low temperature within the range of 1800 to 2100 degrees Celsius provides benefits including a reduced energy cost for heating and an extended operating life of the manufacturing equipment such as the spinner and blower. The temperature of the melting material (20) is too high to directly measure the viscosity thereof. Therefore, the viscosity of the melting material (20) is calculated by using the approach for the evaluation of the viscosity as described in the examples below.

The following will describe the invention in more detail with reference to examples. However, the invention is not limited to these examples.

EXAMPLES

Example 1

Evaluation of the Viscosity of the Melting Material

The melting material is dropped from a height of approximately 100 mm onto a stainless sheet measuring board (SUS403) with a Type 2B surface finish. When the melting material has cooled and solidified, a mass and a projective area, in a vertical direction to the melting material, of the solidified melting material are measured. With the measured values, viscosity index V is calculated using the following formula.

Viscosity index $V$=weight mass (g)/projective area (cm$^2$)

The melting material dropped on the measuring board is rapidly cooled and solidified, and a melting material having a smaller viscosity spreads to a wider area, resulting in a wider projective area thereof. Therefore, a smaller viscosity index V shows a lower viscosity, while a larger viscosity index V shows a higher viscosity.

Example 2

Evaluation of Tensile Strength

Figure 3:
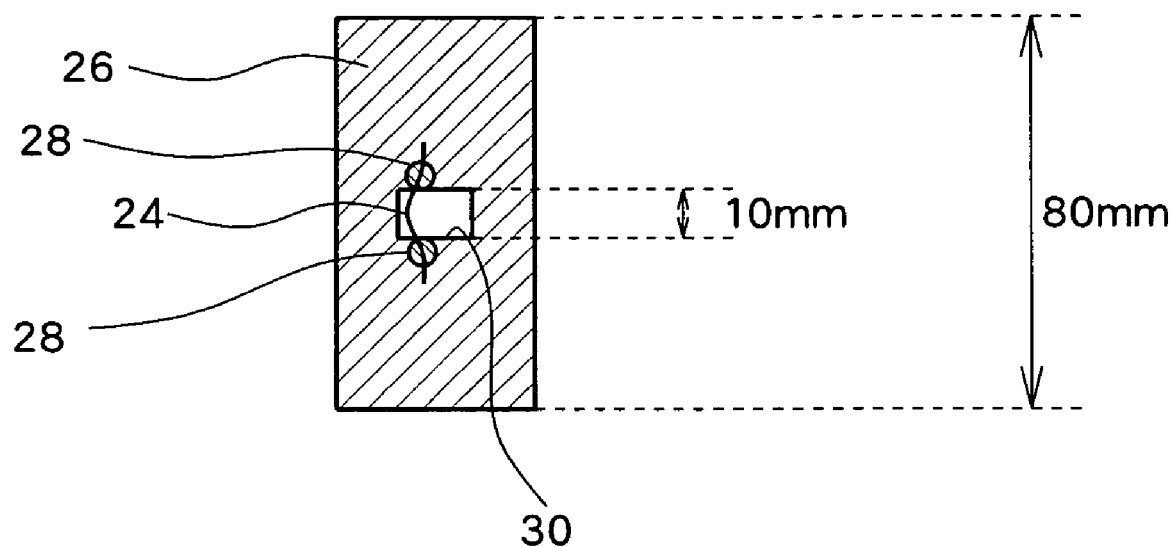
FIG. 3 is a view illustrating a test to measure the tensile strength of a single fiber.

This analysis is performed in accordance with JIS R 7601 "Carbon Fiber Test Method". FIG. 3 illustrates an example of a method to evaluate tensile strength. In FIG. 3, a single carbon fiber is the specimen (24), which is fixed to a holder (26) using an adhesive (28). The holder (26) has a cut-out portion (30) formed between two points at which the specimen (24) is fixed using the adhesive (28).

Next, the holder (26) having the specimen (24) fixed thereupon is cut apart at the right and left position of the cut-out portion (30) to evaluate tensile strength by applying tension in an upward and downward direction as in FIG. 3. The equipment used in this evaluation was an Autograph (AG-50) manufactured by Shimadzu Corporation with a load cell capacity set at 2 kgf and a test speed set at 2 mm/min.

Example 3

Evaluation of Break Resistance

This test is performed by following the four steps outlined below.

Step 1

Release 5 g of inorganic fiber into one liter of water (L).

Agitate the water (L) with a mixer for 15 seconds so that the fiber is dispersed in the water.

Pour the water (L) with the fiber dispersed therein into a measuring cylinder with a capacity of one liter.

Leave the water (L) for 5 minutes in a static condition.

Measure the apparent volume of the fiber.

Step 2

Agitate the water (L) with the fiber dispersed therein for another 285 seconds (300 seconds in total) in a mixer.

Pour the water (L) into the measuring cylinder and leave it for 5 minutes in a static condition.

Measure the apparent volume of the fiber.

Step 3

Determine weight of the fiber remaining on the sieve with 45 μm opening (hereinafter "shot weight").

Step 4

Based on the measured data and using the following formula, calculate the apparent volume per unit weight of the water (L) (the "wet volume", hereinafter, referred to as WV) for both Step 1 and 2.

$WV$ (cm$^3$/g)=apparent volume (cm$^3$)/(weight of fiber−shot weight) (g)

At the beginning of fiber formation, the inorganic fiber takes the form of an aggregated mass of long filaments randomly curved in shape, and therefore, has a certain apparent volume. However, the apparent volume is reduced by agitation, as the mixing operation breaks the filaments and reduces the length of the fibers. Compared to the WV value after the 15 seconds of agitation, the WV value after the agitation of 300 seconds will be smaller.

In other words, fibers having a higher break resistance are unlikely to be broken and shortened by agitation in a mixer.

Therefore, it can be said that the WV value obtained after 15 seconds of agitation indicates the amount of long filaments which were initially contained in the inorganic fiber, while the WV value obtained after another 285 seconds of agitation indicates not only the amount of long filaments but also the intensity of the break resistance of the fiber.

Example 4

Evaluation of Bio-Solubility

The bio-solubility of an inorganic fiber is evaluated by the steps below:

Grind an inorganic fiber and pass it through a 200 mesh sieve in order to obtain approximately one (1) gram of ground sample;

Put the sample into a conical stopcock flask with a capacity of 300 ml;

Add 150 ml of saline composed of the composition shown in Table 1 into the flask;

Apply horizontal vibrations at a frequency of 120 times per minute for a duration of 50 hours while keeping the temperature of the liquid at 40 degrees Celsius; and Filter the liquid. Quantitatively analyze the elements contained in the filtered saline using an ICP atomic emission spectrometer to evaluate the bio-solubility of the inorganic fiber.

TABLE 1

| Name of Substance | Weight |
| --- | --- |
| water | 1 litter |
| sodium chloride | 6.780 g |
| ammonium chloride | 0.535 g |
| sodium hydrogencarbonate | 0.268 g |
| sodium dihydrogen citrate | 0.166 g |
| sodium citrate dihydrate | 0.059 g |
| glycine | 0.450 g |
| calcium chloride | 0.022 g |
| sulfuric acid | 0.049 g |
| solution pH | 7.4 |

Example 5

Evaluation of Heat-Shrinkage Coefficient

The length of an inorganic fiber is measured. Then the fiber is heat-treated at a temperature of 1,260 degrees Celsius for 8 hours. After the fiber is cooled down to the ambient temperature, the length of the fiber is measured again.

The heat shrinkage coefficient of the fiber is calculated based on the measured results, using the following formula:

Heat shrinkage coefficient (%)=(length before heat treatment−length after heat treatment/length before heat treatment×100

Example 6

Production Method of Inorganic Fiber

A raw material having a composition shown in Table 2 was heated and melted at a temperature within a range of 1800 to 2100 degrees Celsius. The obtained melting material was formed into fibers by a quenching method using a blower. The heating and melting of the raw material was performed by placing three electrodes that are connected to a three-phase alternating current power source inside the raw material, and turning the electrodes on. Table 2 shows two Comparative Examples besides three Examples. BaO was not added in Comparative Example 1, and SrO was added instead of BaO in Comparative Example 2.

Source materials of $SiO_2$ in Table 2 include silica sand and glass frit. Source materials of MgO include magnesite, magnesia clinker, olivine, dolomite and glass frit. Source materials of CaO include lime, slaked lime, quicklime, gypsum, dolomite, wallastonite and glass frit. Source materials of BaO include barium carbonate, barium sulfate, barium nitrate, barite and glass frit. Source materials of $Al_2O_3$ include bauxite and alumina powder.

The inorganic fibers obtained using the method described above were evaluated. The results are also shown in Table 2

TABLE 2

| | | | Example 1 | Example 2 | Example 3 | Comparative Example 1 | Comparative Example 2 |
| --- | --- | --- | --- | --- | --- | --- | --- |
| Composition of Raw Material | % by weight | $SiO_2$ | 71.2 | 72.9 | 73.6 | 74.5 | 72.2 |
| | | MgO | 9.8 | 9.3 | 10.1 | 9.0 | 8.7 |
| | | CaO | 14.6 | 15.5 | 14.8 | 15.4 | 13.7 |
| | | $Al_2O_3$ | 1.2 | 1.1 | 1.0 | 1.0 | 1.0 |
| | | BaO | 2.6 | 0.9 | 0.5 | 0 | 0 |
| | | SrO | 0 | 0 | 0 | 0 | 4.2 |
| | | Other | 0.6 | 0.1 | 0.1 | 0.1 | 0.2 |
| Tensile Strength of Single Fiber | MPa | | 549 | 500 | 464 | 269 | 395 |
| Solubility in Saline | % | | 10.8 | 18.7 | 13.6 | 15.1 | 8.5 |
| Heat Shrinkage Coefficient (1260 degree. C. for 8 h) | % | | 2.7 | 3.7 | 2.6 | 1.7 | 3.9 |

TABLE 2-continued

|  |  |  | Example 1 | Example 2 | Example 3 | Comparative Example 1 | Comparative Example 2 |
|---|---|---|---|---|---|---|---|
| WV Value | Time of Agitation: 15 sec. | cm³/g | 209 | 237 | 242 | 130 | 161 |
|  | Time of Agitation: 300 sec. | cm³/g | 51 | 77 | 58 | 22 | 39 |
| Viscosity Index |  | g/cm² | 1.75 | 1.62 | 1.77 | 1.85 | 1.84 |

Table 2 shows that, the values for the tensile strength of a single fiber obtained in Examples 1, 2 and 3 were more than 450 MPa, but in Comparative Examples 1 and 2, the values were less than 400 MPa.

As for the WV value that evaluates break resistance, the values after 15 seconds of agitation exceeded 200 cm³/g and the 10 values after 300 seconds of agitation exceeded 50 cm³/g in Examples 1, 2 and 3. On the other hand, however, in Comparative Examples 1 and 2, the values after 15 seconds of agitation were about 150 cm³/g, and the values after 300 seconds of agitation were less than 40 cm³.

It was discovered by these results that, the tensile strength and the break resistance of the bio-soluble inorganic fiber, which mainly includes $SiO_2$, MgO, CaO and $Al_2O_3$, can be improved by adding BaO, while keeping its bio-solubility and heat shrinkage coefficient.

Furthermore, the viscosity indices of Examples of 1, 2 and 3 are within the range of 1.5 to 2.0 g/cm². Generally, a melting material having a viscosity index of 1.5 g/cm² or less, or 2.0 g/cm² or more is not easily formed into fibers since the viscosity of the melting material is not suitable for fiber formation. The above results show the viscosities of the melts in all Examples of 1, 2 and 3 are within the most suitable range for fiber formation.

The invention claimed is:

1. An inorganic fiber, comprising, on a weight basis, 60 to 80 percent of $SiO_2$, 5 to 20 percent of MgO, 5 to 30 percent of CaO, 0.5 to 5 percent of $Al_2O_3$ and 0.1 to 5 percent of BaO, and having a tensile strength of single fibers of 450 MPa and more.

2. The inorganic fiber according to claim 1, wherein the $SiO_2$ is contained within a range of from 72 to 80 percent by weight.

3. The inorganic fiber according to claim 1, wherein the inorganic fiber has an apparent volume of 200 cm³/g or more per unit weight after being agitated in water for 15 seconds and being left in a static condition and has an apparent volume exceeding 50 cm³/g or more per unit weight after being agitated in water for another 285 seconds and then being left in a static condition.

4. The inorganic fiber according to claim 1, wherein the inorganic fiber has a heat shrinkage coefficient of within a range of 1.0 to 5.0 percent after heating for 8 hours at a temperature of 1260 degrees Celsius.

5. A method for manufacturing inorganic fiber, comprising: heating and melting a raw material which includes, on a weight basis, 60 to 80 percent of $SiO_2$, 5 to 20 percent of MgO, 5 to 30 percent of CaO, 0.5 to 5 percent of $Al_2O_3$ and 0.1 to 5 percent of BaO at a temperature of 1800 to 2100 degrees Celsius; and exposing the melting material to an air flow for fiber forming.

6. The manufacturing method of inorganic fiber according to claim 5, wherein the melting material has a viscosity index (V) within a range of 1.5 to 2.0 g/cm² which is calculated using the following formula:

$$\text{Viscosity index } V = \text{weight mass (g)/projective area (cm}^2\text{)}.$$

* * * * *

UNITED STATES PATENT AND TRADEMARK OFFICE
CERTIFICATE OF CORRECTION

PATENT NO. : 7,615,505 B2  Page 1 of 1
APPLICATION NO. : 11/509680
DATED : November 10, 2009
INVENTOR(S) : Asano et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 592 days.

Signed and Sealed this

Nineteenth Day of October, 2010

David J. Kappos
*Director of the United States Patent and Trademark Office*